(12) United States Patent
Venkatachary (10) Patent No.: US 7,565,380 B1
(45) Date of Patent: Jul. 21, 2009

(54) MEMORY OPTIMIZED PATTERN SEARCHING

(75) Inventor: Srinivasan Venkatachary, Sunnyvale, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 239 days.

(21) Appl. No.: 11/388,785

(22) Filed: Mar. 24, 2006

Related U.S. Application Data (60) Provisional application No. 60/665,478, filed on Mar. 24, 2005.

(51) Int. Cl.
   *G06F 12/00* (2006.01)
(52) U.S. Cl. .................. 707/200; 707/2; 707/6; 707/101; 707/102; 707/103 R
(58) Field of Classification Search ........... 707/3, 707/6, 104.1; 705/10
   See application file for complete search history.

(56) References Cited

U.S. PATENT DOCUMENTS

| | | | | |
|---|---|---|---|---|
| 5,799,299 A | * | 8/1998 | Fujiwara | 707/3 |
| 5,995,963 A | * | 11/1999 | Nanba et al. | 707/6 |
| 6,304,878 B1 | * | 10/2001 | Karlov et al. | 707/102 |
| 6,505,206 B1 | * | 1/2003 | Tikkanen et al. | 707/101 |
| 6,560,610 B1 | * | 5/2003 | Eatherton et al. | 707/104.1 |
| 6,804,677 B2 | * | 10/2004 | Shadmon et al. | 707/101 |
| 6,859,455 B1 | * | 2/2005 | Yazdani et al. | 370/392 |
| 7,290,001 B2 | * | 10/2007 | Bennett et al. | 707/101 |
| 2003/0220830 A1 | * | 11/2003 | Myr | 705/10 |
| 2004/0267732 A1 | * | 12/2004 | Luk et al. | 707/3 |
| 2009/0012958 A1 | * | 1/2009 | Raj | 707/6 |

OTHER PUBLICATIONS

Eisner J., Simpler and More General Minimization for Weighted Finite-State Automata, May 2003, Association for Computational Linguistics, vol. 1, pp. 64-71.*

Navarro G., A Guided Tour to Approximate String Matching, Mar. 2001, ACM, vol. 33, Issue 1, pp. 31-88.*

* cited by examiner

*Primary Examiner*—Apu M Mofiz
*Assistant Examiner*—Jessica N Le
(74) *Attorney, Agent, or Firm*—Shemwell Mahamedi LLP; William L. Paradice, III (57) ABSTRACT

A method of modifying a finite state machine (FSM) wherein the FSM is accessed by a plurality of entries, with each entry comprised of a substring and a next-state pointer, and the FSM is modified so that each entry comprises a length, which is less than or equal to a maximum size boundary placed on a memory device configured for storing the FSM.

9 Claims, 6 Drawing Sheets

Branch Node (BRN) — 410
- SuccessPtr — Exit Path if bitmap indicates valid branch for current search character
- Bitmap — Bitmap array indicating values that correspond to valid branches
- FailPtr — Failover Path if bitmap indicates no valid branch for current search character
- SuccessorIsBRN — Flag indicating whether successor node is a Branch Node
- AdjustIndex — Cursor adjustment to be applied on failover
- Output — Flag or Signature Identifier to indicate that a signature has been found

Fig. 4B

Path Cmp Node (PCN) — 450
- SuccessPtr — Exit Path if bitmap indicates valid branch for current search character
- Bitmap — Bitmap array indicating values that correspond to valid branches
- FailPtr — Failover Path if bitmap indicates no valid branch for current search character
- SuccessorIsBRN — Flag indicating whether successor node is a Branch Node
- AdjustIndex — Cursor adjustment to be applied on failover
- Output — Flag or Signature Identifier to indicate that a signature has been found
- String[Max] — Storage for compressed string — 452
- StrLength — Length of compressed string — 454

```
def ARRAYSIZE 16 struct trie_node {
    void *child;
    int output
};

100  Trie_Node *PopulateTrie(char * signature_list[], int NumSignatures)  // generated expanded trie based on signature list
     {
110      Trie_Node *NodePtr;
         Char *sigcursor
         int i;

120      NodePtr = malloc (ARRAYSIZE * sizeof(Trie_Node));  // allocate top level node in trie
130      for (i = 0; i<NumSignatures; i++)  // Loop for each signature in list
         {
140          for (sigcursor = signature_list[i]; *sigcursor; sigcursor++)  // loop for each character in signature
             {
150              if (NodePtr[*sigcursor]->child == Null)  // if pointer slot is empty
160                  NotePtr[*sigcursor]->child = malloc (ARRAYSIZE * sizeof(Trie_Node));  //allocate next level node in trie
170              NodePtr = NodePtr[*sigcursor]->child;  // progress to next level node and repeat
             }
             // all trie nodes allocated for current signature and NodePtr[*(--sigcursor)] points to leaf node for signature
180          NodePtr[*(--sigcursor)]->output = TRUE;
         }
         // all signatures processed and used to populate expanded trie
190      return (NodePtr);  // return handle to the expanded trie to caller
     }
```

MEMORY OPTIMIZED PATTERN SEARCHING

CROSS-REFERENCE TO RELATED APPLICATIONS

This application claims priority from, and hereby incorporates by reference, U.S. Provisional Application No. 60/665,478, filed Mar. 24, 2005 and entitled "Memory Optimized Pattern Searching (MOPS)."

TECHNICAL FIELD

The present invention relates generally to the field of data processing, and more particularly to data searching methods and apparatus.

BACKGROUND

A network system attack (also referred to herein as an intrusion) is usually defined as an unauthorized or malicious use of a computer or computer network. In some cases, a network system attack may involve hundreds to thousands of unprotected network nodes in a coordinated attack, which is levied against specific or random targets. These attacks may include break-in attempts, including but not limited to, email viruses, corporate espionage, general destruction of data, and the hijacking of computers/servers to spread additional attacks. Even when a system cannot be directly broken into, denial of service attacks can be just as harmful to individuals and companies, who stake their reputations on providing reliable services over the Internet. Because of the population's increasing usage and reliance on network services, individuals and companies have become increasingly aware of the need to combat system attacks at every level of the network, from end hosts and network taps to edge and core routers.

Intrusion Detection Systems (or IDSs) are emerging as one of the most promising ways of providing protection to systems on a network. Intrusion detection systems automatically monitor network traffic in real-time, and can be used to alert network administrators to suspicious activity, keep logs to aid in forensics, and assist in the detection of new viruses and denial of service attacks. They can be found in end-user systems to monitor and protect against attacks from incoming traffic, or in network-tap devices that are inserted into key points of the network for diagnostic purposes. Intrusion detection systems may also be used in edge and core routers to protect the network infrastructure from distributed attacks.

Intrusion detection systems increase protection by identifying attacks with valid packet headers that pass through firewalls. Intrusion detection systems provide this capability by searching both packet headers and payloads (i.e., content) for known attack data sequences, referred to as "signatures," and following prescribed actions in response to detecting a given signature. In general, the signatures and corresponding response actions supported by an intrusion detection system are referred to as a "rule-set database," "IDS database" or simply "database." Each rule in the database typically includes a specific set of information, such as the type of packet to search, a string of content to match (i.e., a signature), a location from which to start the search, and an associated action to take if all conditions of the rule are matched. Different databases may include different sets of information, and therefore, may be tailored to particular network systems or types of attack.

Figure 1:
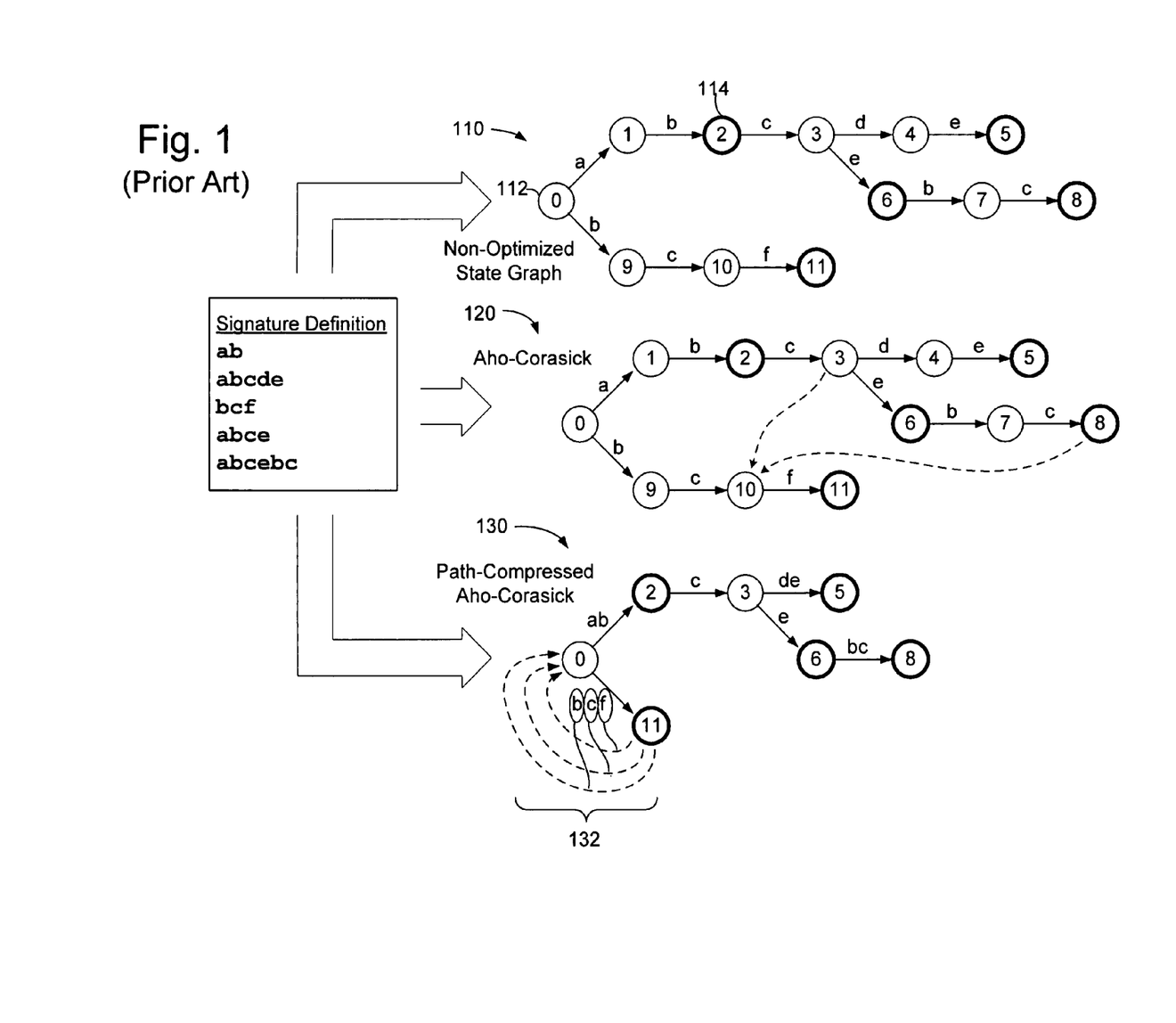
FIG. 1 illustrates prior art string matching techniques.

At the heart of most modern intrusion detection systems is a string matching engine that compares the data arriving at the system to one or more signatures (i.e., strings) in the rule-set database and flags data containing an offending signature. As data is generally searched in real time in ever-faster network devices and rule databases continue to grow at a tremendous rate, string matching engines require rapidly increasing memory capacity and processing power to keep pace. Consequently, to avoid the escalating costs associated with ever-increasing hardware demands, designers have endeavored to improve the efficiency of the string matching methodology itself. FIG. 1, for example, illustrates a progression of approaches that have resulted in increased string matching speed, reduced memory requirements or both. In one approach, signatures within a signature definition (i.e., list of signatures) are decomposed into elemental states to form a representation of the signature definition referred to as a non-optimized state graph 110. After generating the state graph, a string matching engine may progress from state to state within the graph according to the sequence of incoming values. For example, starting from root node '0', if an 'a' is received, the string matching engine transitions to state '1' and, if a 'b' is received, from state '1' to state '2.' State '2' is referred to as an output state 112 (and shown in bold in FIG. 1 to indicate such) as a sequence of data values matching the signature "ab" has been detected. After reaching state '2', the string matching engine may transition to states 3, 4 and 5 or 3, 6, 7 and 8, upon receiving data sequences "cde" or "ebc," respectively, or may return to the root node 112 if, at any node, the data at the cursor position (i.e., the incoming data value to be evaluated, also referred to herein as the "cursor data") does not match any of the transition data values, referred to herein as edges, associated with the current node. Thus, if at node '3' the cursor data is neither a 'd' nor an 'e', the string matching engine returns to the root node 112 and evaluates the cursor data against the edges (i.e., 'a' and 'b') at that node. If the cursor data does not match an edge of the root node, the string matching engine remains at the root node and advances the cursor.

String matching using the non-optimized state graph 110 results in a number of inefficiencies both in terms of state graph storage requirements and state graph processing. With regard to storage, each signature definition requires a worst-case storage of N*W nodes (i.e., where N is the number of signatures and W is the average signature length, and where the worst case occurs when there are no shared sub-strings between signatures) and thus escalates exponentially if both the length and number of signatures increases as has been the trend. From the stand point of state graph processing, returning to the root node for each non-matching cursor data requires rewinding the cursor according to the length into the trie and thus substantial reprocessing of data.

Still referring to FIG. 1, a string-matching approach with substantially reduced data reprocessing may be achieved using the Aho-Corasick state graph 120. In the Aho-Corasick scheme, instead of returning to the root in response to edge failure (i.e., when the cursor data does not match any of the transition data values), the string matching engine may transition to a state that constitutes an accumulated substring within the path in which edge failure occurs. For example, if edge failure occurs at state '3' (i.e., cursor data is not a 'd' or 'e'), the string matching engine, having traversed the path "abc" and thus detected substring "bc," may transition directly to state '10', which corresponds to detection of "bc," without having to return to the root node and rewind the cursor. Thus, transition to a non-root node in response to edge failure, a transition referred to herein as a "failover," may save substantial data reprocessing and thus reduce processing load on the string matching engine. Unfortunately, the gain in processing efficiency incurs a memory consumption penalty as the Aho-Corasick state graph requires storage of additional failover pointers (i.e., pointers to the failover destinations) in addition to the worst-case W*N storage associated with the non-optimized state graph.

In the last string matching approach shown in FIG. 1, path compression is applied to the Aho-Corasick state graph to obtain a path-compressed state graph 130 having a reduced number of nodes, and therefore a reduced memory storage requirement. Path compression involves concatenating linear (i.e., non-branching) sequences of state transitions into a single state transition with the sequence of data values that formerly formed the edges in the sequence of states concatenated into a string that forms the edge in the unified transition. The result of this operation is to reduce the number of nodes from W*N relative to the traditional Aho-Corasick scheme shown at 120 to a worst-case 2N nodes (i.e., each new signature requires addition of at most two nodes as when an existing path-compressed node is changed into a branch node plus two path-compressed nodes) thus reducing the number of nodes by the factor W/N. Unfortunately, the reduction in the number of nodes does not translate to a proportional reduction in required memory as the number of pointers required generally remains at N*W plus a number of pointers assigned to enable failover operation. That is, because an edge failure in a path-compressed node may result from failure at each of the individual data values, a separate failure pointer (i.e., a pointer to a failover node or to the root node) is typically provided for each data value of the compressed string to enable the traditional Aho-Corasick failover operation. This is illustrated in FIG. 1 by the three separate failure pointers to the root 132 for the constituent data values 'b', 'c' and 'f' of the compressed string (note that while the failure pointers all point to the root in the example shown, if data values 'b,' 'c' or 'f,' or data sequences 'bc' 'cf' or 'bcf' appear in other extensions from the root node, the failure pointer for the corresponding data value may point to the appropriate state within the other extension to effect the Aho-Corasick failover operation). Thus, while substantial memory savings is achieved using the path-compressed Aho-Corasick approach, memory consumption still increases exponentially with increased signature quantity and length in each new generation of rule databases.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single-conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. The term "exemplary" is used to express an example, and not a preference or requirement.

String matching apparatus and methods that consume substantially less memory than in the approaches outlined in reference to FIG. 1 are disclosed herein in various embodiments. In one embodiment, a rule data base is converted to a path-compressed state graph in which each of the constituent nodes has a single failover pointer, regardless of the number of data values that are concatenated to form the state transition condition. The total number of nodes is limited to 2N in the worst case (N being the number of signatures in the rule database) as each new signature results in the addition of either a single path-compressed node or a replacement of a path compressed node with a branch node and two path-compressed successor nodes. Because each node has a single failure pointer, and the total number of failure pointers is limited to a worst case of 2N, thus consuming substantially less memory than the W*N failure pointers of the above-described path-compressed Aho-Corasick approach 120. More specifically, as the average signature length, W, continues to increase and typically ranges between 20 to 100, the total number of failure pointers may be reduced by a factor ranging from 10-50, an order of magnitude savings in memory.

Another benefit of providing a single failure pointer per state-graph node is that all nodes in the state graph may be substantially the same in size or may fall within one of a small number of sizes and thus yield increased determinism in node storage requirements. In particular, in one embodiment, each nodes within the state graph is constructed as either a branch node or a path compression node, each node type having a single failure pointer and a single success pointer. Further, by limiting the length of the path-compressed string according to the data interface width of the node storage memory, each memory access may be ensured to retrieve the contents of at least one node (also referred to herein as node data or a node definition) and thereby increase processing speed and operational determinism over implementations that require multiple memory accesses to obtain contents of a single node.

As discussed in greater detail below, embodiments having a single failure pointer per state-graph node may incur some additional node reprocessing due to less precise (i.e., coarser)

failover operation. Analysis generally shows, however, that the reduction in memory consumption more than compensates for the reprocessing penalty in a broad range of applications, for example, by enabling use of faster node storage memory that would be prohibitively expensive in the quantity required by less memory-efficient approaches (e.g., static random access memory (SRAM) or reduced-latency dynamic random access memory (RLDRAM) instead of cheaper, slower commodity DRAM) or by enabling one or more replications of the state graph and thus parallel processing of the incoming data stream by multiple string matching engines each having its own copy of the state graph.

Figure 2:
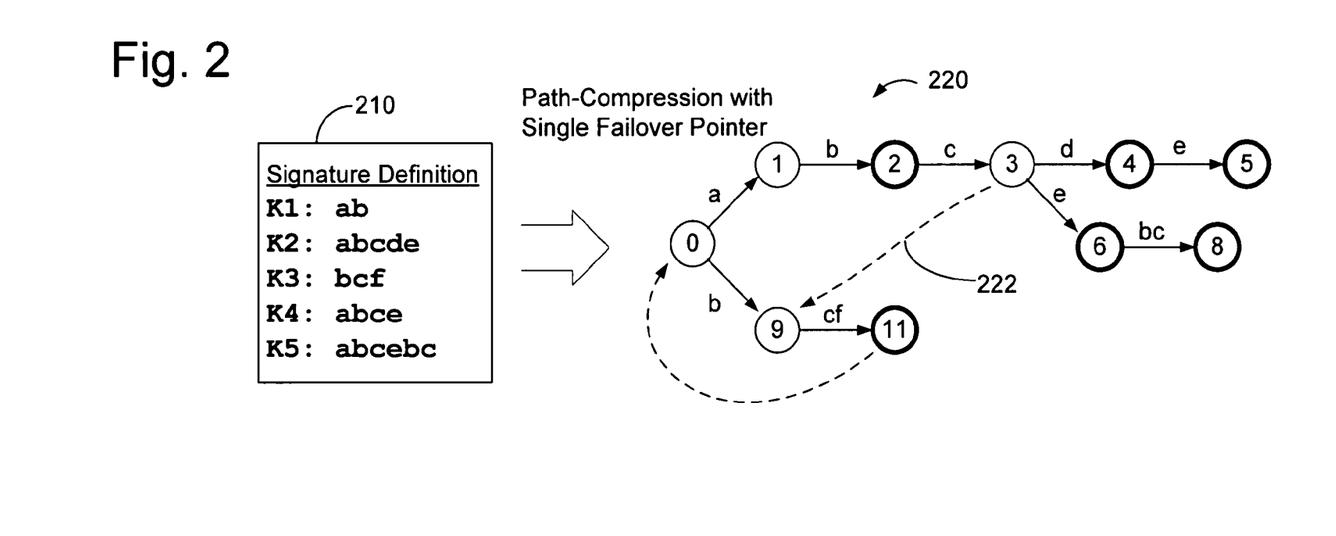
FIG. 2 illustrates an exemplary single-failover, path-compressed state graph that may be constructed and applied in various string matching engines according to embodiments of the invention.

FIG. 2 illustrates an exemplary single-failover, path-compressed state graph 220 that may be constructed and applied in various string matching engines according to embodiments of the invention. A signature definition (i.e., list of signatures that may constitute all or a portion of a rule database) is also shown 210, as an example, to explain the construction and processing of the state graph. The state graph includes nine states or nodes numbered to be consistent with the states shown in the uncompressed state graph 110 of FIG. 1. Each of the nodes having two or more data-match transitions, shown by solid lines extending from the state along with the edge (i.e., character or data value from the input data sequence determined to match a character within the signature definition 210) that yielded the transition, is referred to herein as a branch node and each of the nodes having a single data-match transition is referred to herein as a path compression node. Examples of data structures that may be used to implement or represent the branch nodes and path compression nodes are described below. Also, in a simple embodiment having a small number of rules that share an initial data sequence or substring, the root node '0' may have a single data-match transition, also referred to herein as a success transition, and yet be implemented by a branch node. Fail transitions or failover transitions extending from state '3' to state '9' and from state '11' to root node '0' are marked by dashed lines and are effected by failure pointers within the underlying data structure. As discussed, each of the nodes in the state graph includes a failure pointer, though only the failure transitions from nodes '3' and '11' are shown to avoid obfuscating other aspects of the state graph.

Still referring to FIG. 2, it can be seen that the five signatures in the signature definition, K1-K5, are signaled by the string matching engine upon reaching nodes '2' (K1), '5' (K2), '6' (K4), '8' (K5) and '11' (K3) as indicated by the bolded circles at those nodes. That is, upon detecting an 'a' followed by a 'b', the string matching engine progresses from root node '0' to node '1' and then node '2', signaling detection of string K2 upon transitioning to node '2'. Also, with respect to each branch node, a single character constitutes the edge for each branch, so that, in contrast to the path-compressed Aho-Corasick scheme described in reference to FIG. 1, the two branches leading from root node zero (a branch node) are defined by single-character edges 'a' and 'b' that lead to intermediate nodes '1' and '9', respectively, instead of character strings that lead directly to output nodes '2' and '11.' As described below, this arrangement enables each branch node to be implemented with a single success pointer that is indexed according to cursor data (i.e., value of the incoming data sequence that is evaluated to determine the next node transition), thus reducing the memory space required within the branch nodes to represent the branch destination. In alternative embodiments, strings of two or more characters may be recorded as edges in the branch node data structures. Also, in one embodiment, each output node (i.e., node for which an output is signaled) is marked by a branch node or a path compression node having a single-character edge. In alternative embodiments, strings may be used as edges for output nodes.

Still referring to FIG. 2, the failover transition from node '3' to node '9' marked by dashed line 222 results when the cursor data does not match any of the edges extending from branch node '3.' Because the data sequence that rendered the string matching engine to node 3 included the sequence 'b' and 'c,' a portion of the K3 signature, 'bcf,' the failover to state '9' avoids the need to rewind the cursor (i.e., move the cursor backward within the received data sequence) to the 'b' data value, and thus avoids redundant reprocessing. In each node for which the input edge sequence (i.e., sequence of data values or portion thereof that lead the string matching engine to the node) does not correspond to an initial edge sequence of another branch from the root node, the fail pointer is assigned the value of the root node so that searching will continue at the root node without rewinding the cursor. For example, upon reaching leaf node '11' (i.e., the final node in the branch of nodes that starts at the root node with branching edge 'b'), no other branch of the root node includes the sequence 'bcf', so that the string matching engine will follow the failure pointer back to the root node and compare the current cursor data to the edges ('a' and 'b') for that node. Failure pointer assignment and cursor rewinding are discussed in further detail below.

Figure 3:
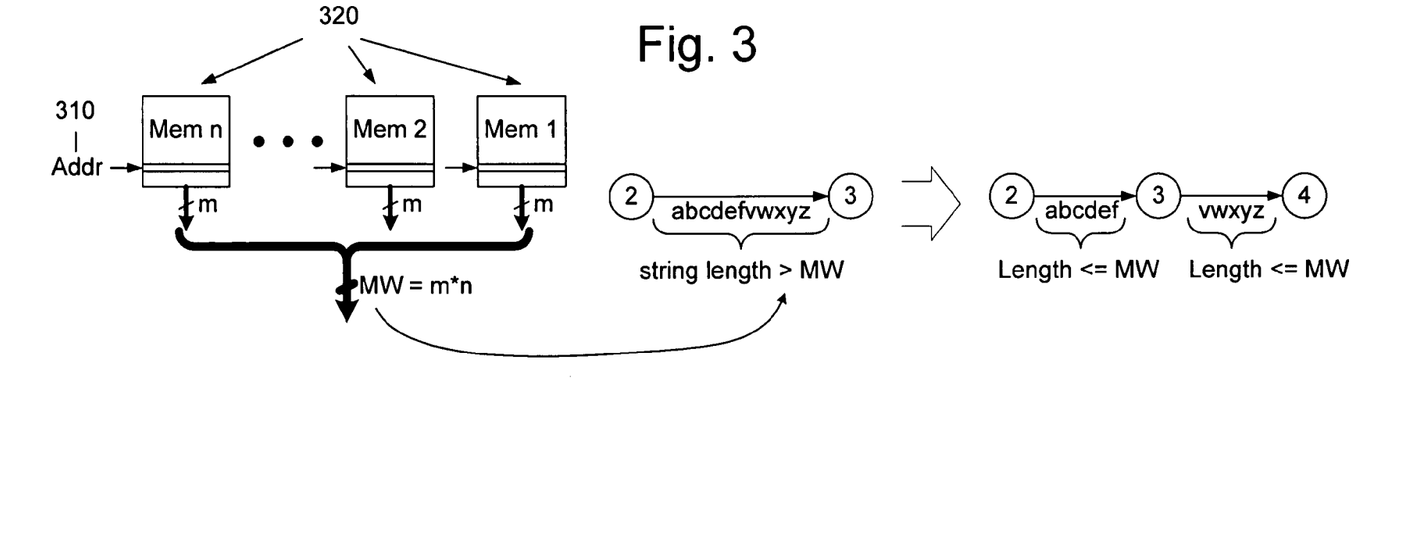
FIG. 3 illustrates an optional optimization that may be applied in various embodiments of string matching engines described herein.

FIG. 3 illustrates an optional optimization that may be applied in various embodiments of string matching engines described herein to enable node definitions (i.e., the data that corresponds to a node within the node graph of FIG. 2 or subsequent Figures) to be read out of memory in a single memory access, thus avoiding the relatively long latency that might otherwise be incurred for node definitions that extend across multiple memory word widths. Thus, in a memory system having n memory devices that each contribute a respective group of m bits to a memory data word in response to an address value 310 (Addr), the resulting memory interface width, MW (also referred to herein as the data width, data interface width or native data width of the memory system) is m*n bits wide. As shown, in an embodiment, path compression nodes that might otherwise include strings that exceed the memory interface width (i.e., string length>MW) may be partitioned or decomposed into multiple successive path compression nodes each having string lengths less than or equal to the memory interface width. As discussed above, by limiting the length of the path-compressed string according to the interface width of the node storage memory, each memory access may be ensured to retrieve the contents of at least one node and thereby increase processing speed and operational determinism over implementations that require multiple memory accesses to obtain contents of a single node. Note that the memory system itself, though depicted as being formed by a discrete set of memory devices 320, may be implemented within a single integrated circuit die (or multiple die within a single integrated circuit package) which may also include circuitry for implementing a string matching engine according to one or more embodiments disclosed herein.

Figure 4A:
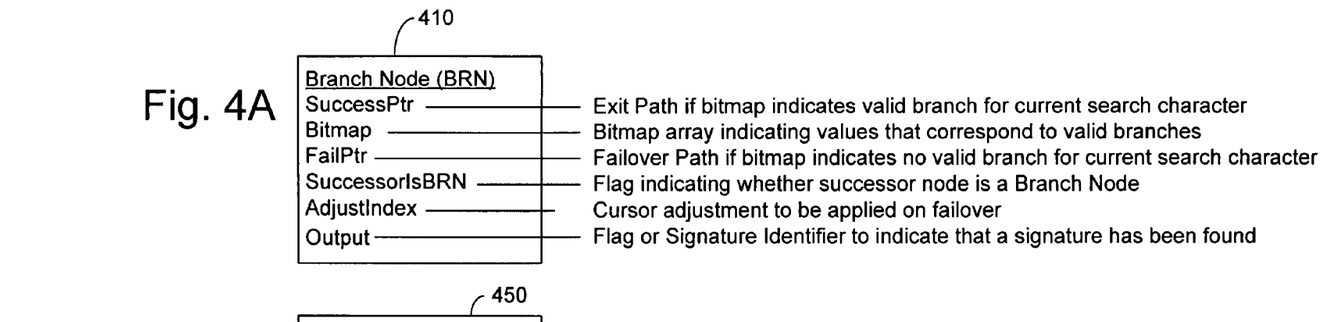
FIGS. 4A and 4B illustrate exemplary data structures that may be used to instantiate a branch node and path-compression node, respectively, within the single-failure pointer state graph of FIG. 2.
Figure 4B:
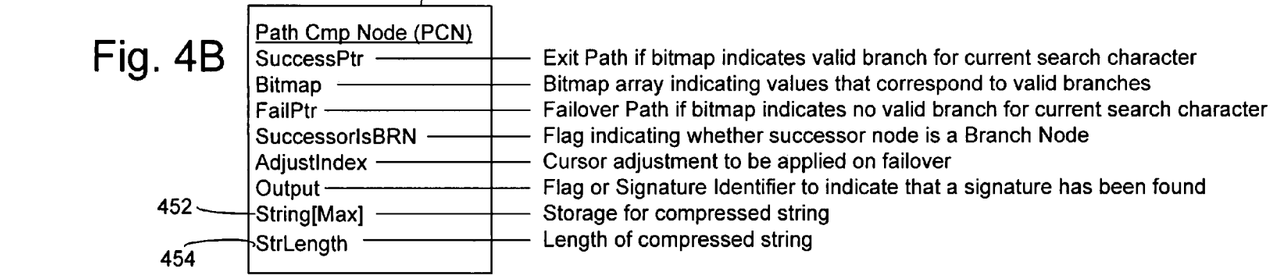

FIGS. 4A and 4B illustrate exemplary data structures that may be used to instantiate a branch node and path-compression node, respectively, within the single-failure pointer state graph of FIG. 2. As shown, the Branch Node (BRN) data structure 410 shown in FIG. 4A includes a single success pointer (SuccessPtr) and a single failure pointer (FailPtr) that establish the exit paths for the node. If the successor (i.e., destination or downstream node) is a branch node (indicated by flag, SuccessorIsBRN), a bitmap value (Bitmap) is used to qualify the success pointer, and enable branching to one of a collection of branch nodes according to the cursor data. As described in further detail below, if the cursor data is indicated by the bitmap not to be a valid edge (i.e., not a valid branch data value) for the source branch node (i.e., the node from which the branch is being taken), the failover path established by the failure pointer will be followed. If the bitmap indicates that the cursor data is a valid edge, logic associated with the bitmap is used to generate an offset which, when added to the success pointer, yields a child pointer that is followed to transition the string matching engine to the desired downstream branch node. If the successor node is indicated by SuccessorIsBRN to be a path compression node instead of a branch node, then the success pointer is followed without offset (i.e., offset set to zero) to the path compression node if the cursor data is indicated by the bitmap to be a valid edge, and the failure pointer is followed if not.

Still referring to FIG. 4A, a cursor adjustment value (AdjustIndex) is provided to control the cursor adjustment to be applied on failover, and an output value (Output) is provided to indicate whether a signature has been found when the branch node is reached. Assignment of values to the pointers, bit map, successor node type, cursor adjustment value and output value are described in further detail below in connection with construction of the single-failure pointer node graph for a given signature definition.

Turning to FIG. 4B, the exemplary path compression node (PCN) data structure 450 includes the same member data values as the branch node data structure of FIG. 4A, along with a string storage buffer (String) 452 having a size (Max) according to the data interface width of the node storage memory system, and a string length value (StrLength) 454 that indicates the actual size (i.e., number of characters or data elements) of the string stored within the string storage buffer.

Figure 5:
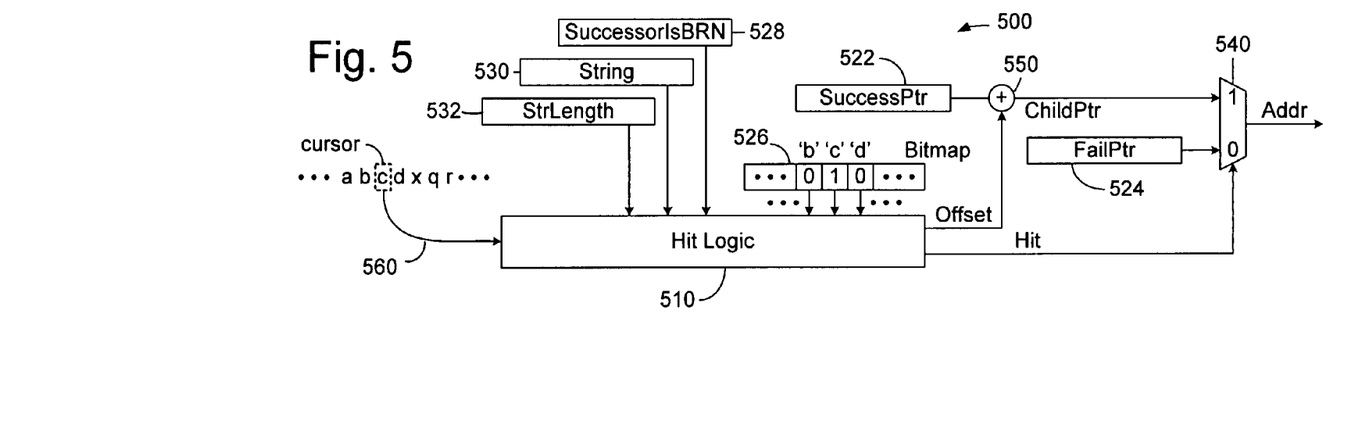
FIG. 5 illustrates an exemplary address logic circuit 500 that may be included within a string matching engine according to one embodiment.

FIG. 5 illustrates an exemplary address logic circuit 500 that may be included within a string matching engine according to one embodiment. The string matching engine may be implemented within an integrated circuit device (or collection of integrated circuit devices) that includes or is coupled to a node storage memory and that has control circuitry for iteratively retrieving, and processing nodes of the state graph, the control circuitry including, in one embodiment, the address logic circuit of FIG. 5 for determining a pointer (i.e., address value, Addr) to each successive node to be retrieved from the node storage memory. In the particular embodiment shown, the address logic includes hit logic, multiplexer 540 and offset circuit 550, together with storage elements 522, 524, 526, 528, 530 and 532 to hold the success pointer, failure pointer, bitmap, successor-type, string and string length values retrieved from the node storage memory as part of the node currently being processed. The hit logic receives the bitmap, string, string length and successor-type values from storage elements 526, 530, 532 and 528, as well as one or more characters from an incoming data sequence (which may be maintained, for example, in a buffer circuit, shift register or other storage) at an offset determined by a cursor value 560. Note that, in the case of a shift register, first-in-first-out (FIFO) buffer, last-in-first-out (LIFO) or other ordered-entry storage circuit, the cursor position may be defined, for example, to be the head or intermediate element of such storage circuit.

Still referring to FIG. 5, if the successor-type value in storage element 528 indicates that the successor node is a path-compression node rather than a branch node, the hit logic indexes the bitmap received from storage element 526 using the cursor data to determine whether the bitmap indicates a valid branch for the cursor data. In the particular example shown, for instance, the cursor data is a 'c,' a value which, when used to index the bitmap retrieves a logic '1' bit indicating that 'c' is a valid edge. Accordingly, the hit logic asserts a hit signal to indicate that the cursor data represents a valid edge and generates an offset value that indicates an offset into an array of branch nodes at which the branch node for data value 'c' is located. In one embodiment, for example, the hit logic includes summation logic to generate a value that indicates how many logic '1' bits are stored at lower-ordered positions within the bitmap (i.e., lower-ordered relative to the 'c' index position) and to output that value as the offset. Thus, if there are no logic '1' bits stored at lower-ordered positions within the bit-map, the offset value will be zero to indicate that the branch node for data value 'c' is the first branch node in the branch node array.

The offset value may be multiplied by a value that corresponds to the size of the branch node structure to obtain a stepwise offset that, when added to the success pointer in circuit 550 yields a child pointer that indexes into the appropriate location within an array of branch nodes. Note that the offset value may alternatively be applied to retrieve the successor branch node from the desired offset within a memory word after the word has been retrieved from memory if, for example, the memory word is wide enough to hold two or more branch node definitions. In either case, the hit signal is supplied to the control input of the multiplexer 540 so that, if asserted, the child pointer is selected as the address of the next node to be retrieved from the node storage memory. If the hit signal is not asserted, then an edge failure has occurred and the fail pointer is selected as the address of the next node to be retrieved from the node storage memory, thus effecting failover operation.

Still referring to FIG. 5, if the successor-type value in storage element 528 indicates that the successor node is a path-compression node rather than a branch node, the bitmap is ignored and the hit logic outputs a zero-valued offset. The hit logic also compares a substring of K data values from the input data sequence (i.e., the K values, cursor[0], cursor[1], . . . , cursor[K−1], with K being obtained from string length storage element 532) with the substring within storage element 530 (i.e., the first K data values within the string storage element) and asserts or deasserts the hit signal according to whether the substrings match. Thus, if the substrings match, the hit signals asserted, and the success pointer is output as the address of the next node to be retrieved from the node storage memory so that the success pointer is followed to the successor path-compression node. Alternatively, if the substrings do not match, the hit signal is deasserted and the failpointer 524 is output as the address of the next node to be retrieved and thus effect a failover operation. Though not specifically shown, the hit logic may also receive the adjust index from the node currently being processed and thus operate to adjust the cursor position relative to the input data sequence (i.e., increasing or decreasing a value that constitutes a pointer into the input data sequence, or right or left shifting the input data sequence within a shift register or the like to effect cursor movement).

In one embodiment, the single-failure pointer node graph, also referred to herein as a memory-optimized pattern searching (MOPS or mops) graph, is instantiated through the following operations:

1. A preliminary trie structure is constructed, and then preprocessed to store statistics within each node of the trie to indicate how many 'children' the trie node has and how many 'outputs' (i.e., signatures) are present in the children.

2. In this embodiment, a memory-optimized pattern searching (MOPS) graph may be constructed using the preliminary trie as a basis. The preprocessed information present in the nodes of the preliminary trie is utilized to calculate parent/child/sibling relationships and to identify 'relevant nodes,' in this fashion: 'Child' nodes of the same parent node are denoted as Sibling Collections. In each Sibling Collection, the nodes that have a further child pointer or an output state are identified, and these are termed 'relevant nodes'. A node that has both a further child pointer and an output state, is considered as a single relevant node.

3. In further construction the memory-optimized pattern searching (MOPS) graph of this embodiment, sequences of relevant nodes that form a non-branching path within the preliminary trie are 'marked' to establish the start and end of the non-branching path.

4. For each Sibling Collection that has 2 or more 'relevant nodes' in the preliminary trie, a collection of 'branch nodes' is created in the MOPS graph. Each of the relevant nodes correspond to one of the branch nodes in the MOPS graph.

5. For each identified non-branching path in the preliminary trie, one or more PC Nodes (i.e., path compression nodes) are created in the MOPS graph. The very first node in the non-branching path (that is, the node closest to the root) in the preliminary trie is considered as the 'corresponding' node in the preliminary trie for the path compression (PC) Node created in the MOPS graph.

6. In the embodiment each node in the MOPS graph has a success pointer, which is established in accordance with the relationship of corresponding nodes in the preliminary trie. In an embodiment, S is a sibling collection in the preliminary trie, and P is the node with S as the child. In this embodiment, let S' be the branch node collection corresponding to S in the MOPS graphs. Let A be the earliest ancestor of S, starting with P, to have a corresponding node in the MOPS graph. This may be designated A'. The success pointer of A' points to S'.

7. Each node in the MOPS graph consists of a failure pointer and a backoff value. These values can be established by implementing the following procedure:

a. Take the string that is formed by following the path from the root of the MOPS graph up to and including the node under consideration. Let the length of this string be L.
  b. Remove the first character in the string. Starting from the root, follow the newly formed shorter string through the MOPS graph to determine the node that it leads to, say X.
  c. Repeat 7b till X is not NULL, or till the string is empty. Let the number of repetitions be R.
  d. Set the failure pointer to X.
  e. If X is NULL, set backoff to 0. Otherwise, set the backoff value=L−(R+1)−length of string formed by following the path from the root to the node pointed to by X, not including the string stored in node X.

After the MOPS graph has been instantiated, it may be searched in connection with incoming data sequences to carry out string matching operations as follows:

For a given search string, follow the MOPS graph from the root and cursor on the search string set to 0.

a. If all characters in the search string have been processed, stop. Otherwise, If a BRN is encountered, check the bitmap position corresponding to the next character.
  b. If bitmap position is non-zero, read the corresponding branch node. If there is a output value stored in the node, output the value. Advance the cursor to the next character, and set the node to the success pointer in the branch node. Go back to step a.
  c. If bitmap position is zero, then follow the failure pointer. Backoff the cursor by the backoff value stored in the node. Set the node to the node pointed by the failure pointer and go back to step a.
  d. If a PCN is encountered, compare the string. If the string is fully matched, if there is an output stored in the node, output it. If the success pointer is pointing to a BRN, check the bitmap position corresponding to the next character. If the bitmap position is non-zero, follow to the corresponding branch node. Goto step a.
    If the success pointer is pointed to a PCN, follow to the PCN and go back to step a. In either case, adjust the cursor by the length of the string stored in the PCN.
  e. If the string mismatches, follow the failure pointer from the parent.
    Adjust the cursor by the backoff value stored in the parent and the number of characters processed in the current node before failure occurred. Go back to step a.

Figure 7:
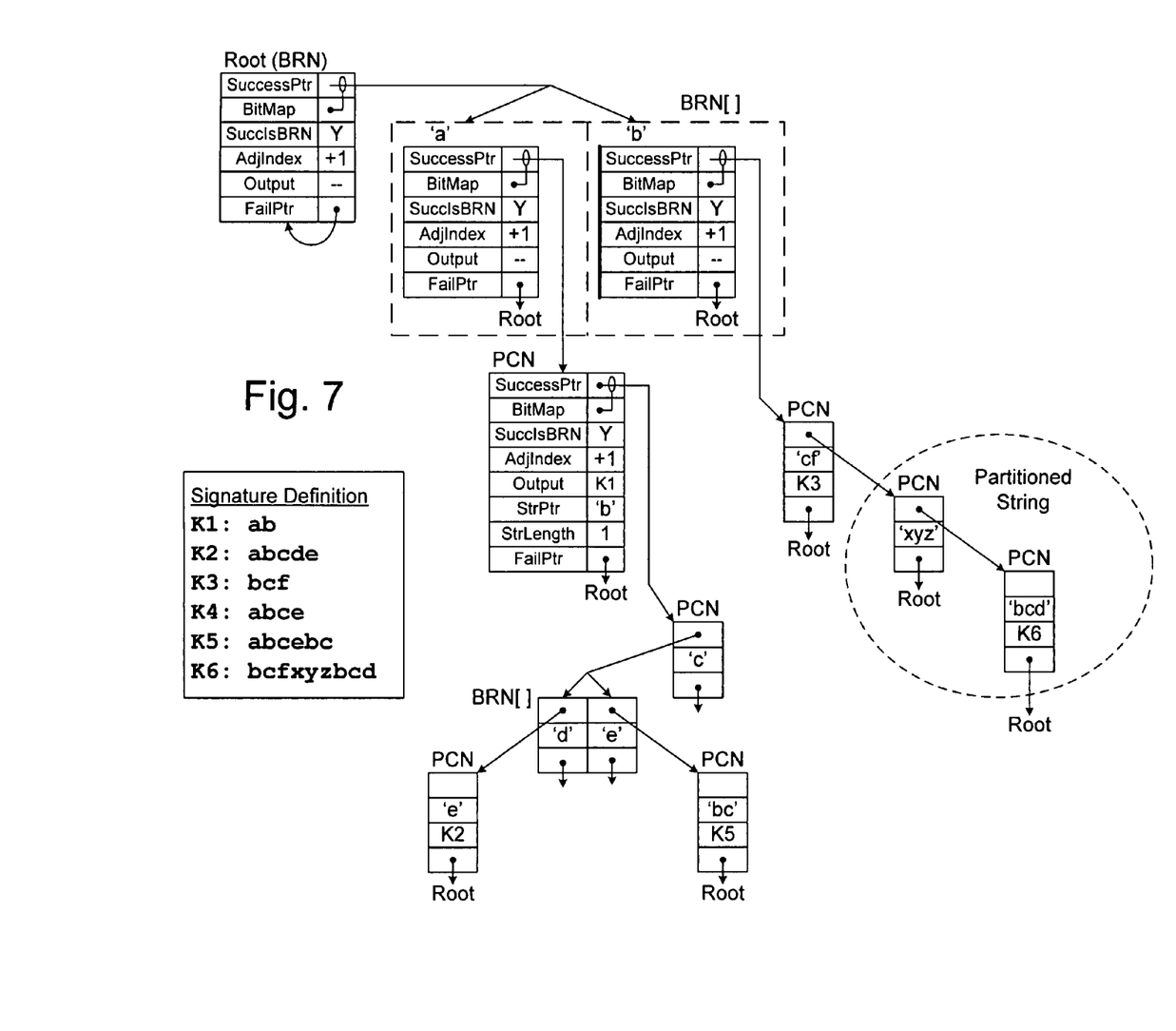
FIG. 7 is an exemplary view of a Memory Optimized Pattern Search graph that results from following the operations listed in FIG. 6A using an exemplary signature definition.

FIG. 7 is an exemplary view of a mops graph that results from following the preceding operations using an exemplary signature definition. Appendix A hereto includes pseudocode listings for carrying out the above construction and search operations.

The pseudocode listing of FIG. 6A and in Appendix A below generally follow the C++ programming language syntax, though such listings are provided to illustrate an exemplary sequence of operations for population and traversal of embodiments of a single-failure node graph and should not be construed as requiring a particular hardware or computing environment for such operations. In all such pseudocode listings, the operations described may be carried out by dedicated hardware circuitry within one or more integrated circuit devices, one or more programmed computing systems, and/or a combination of dedicated hardware and one or more programmed computing systems.

Figure 6A:
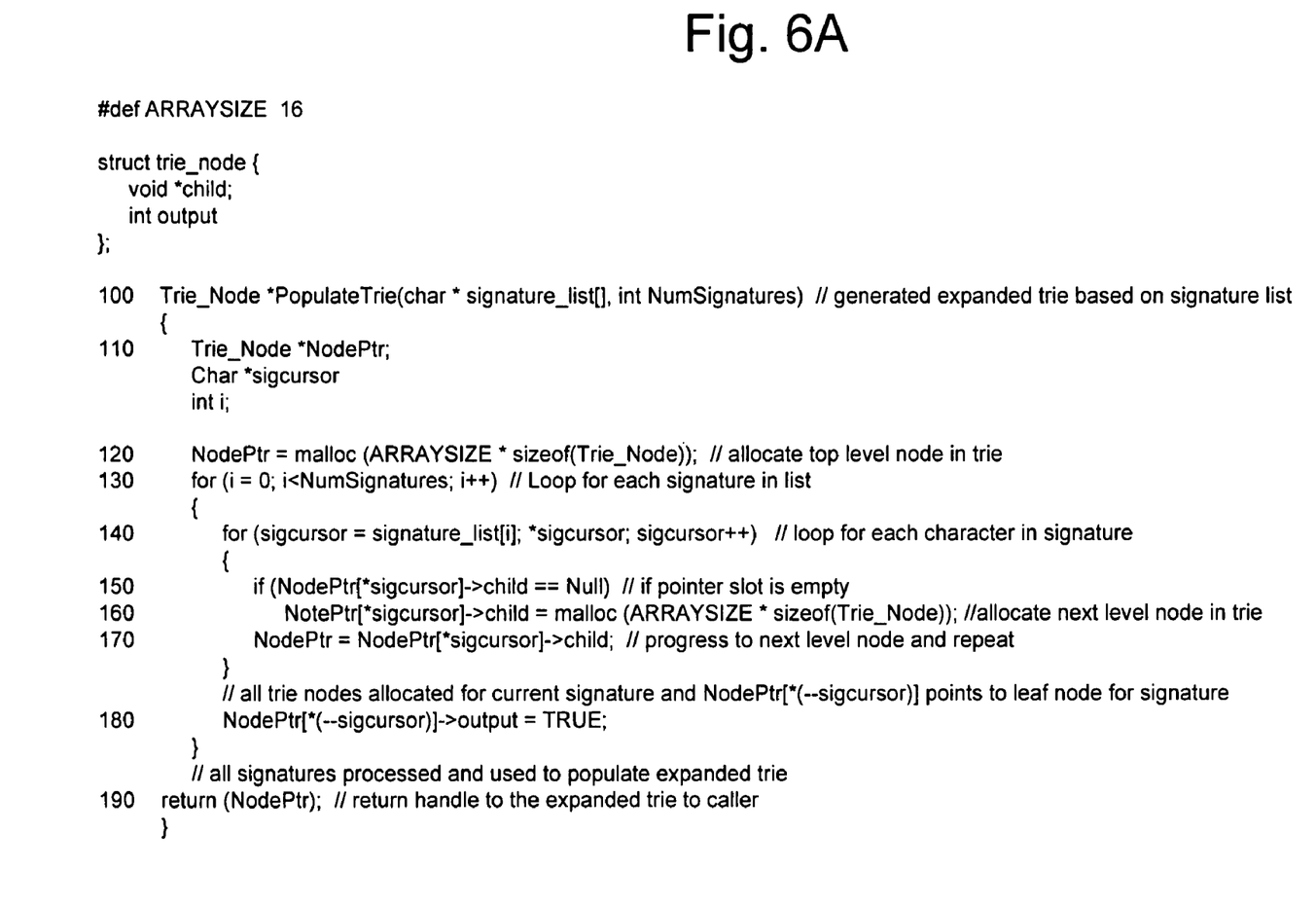
FIG. 6A is a pseudocode listing which illustrates an exemplary sequence of operations for population and traversal of embodiments of a single-failure node graph.
Figure 6B:
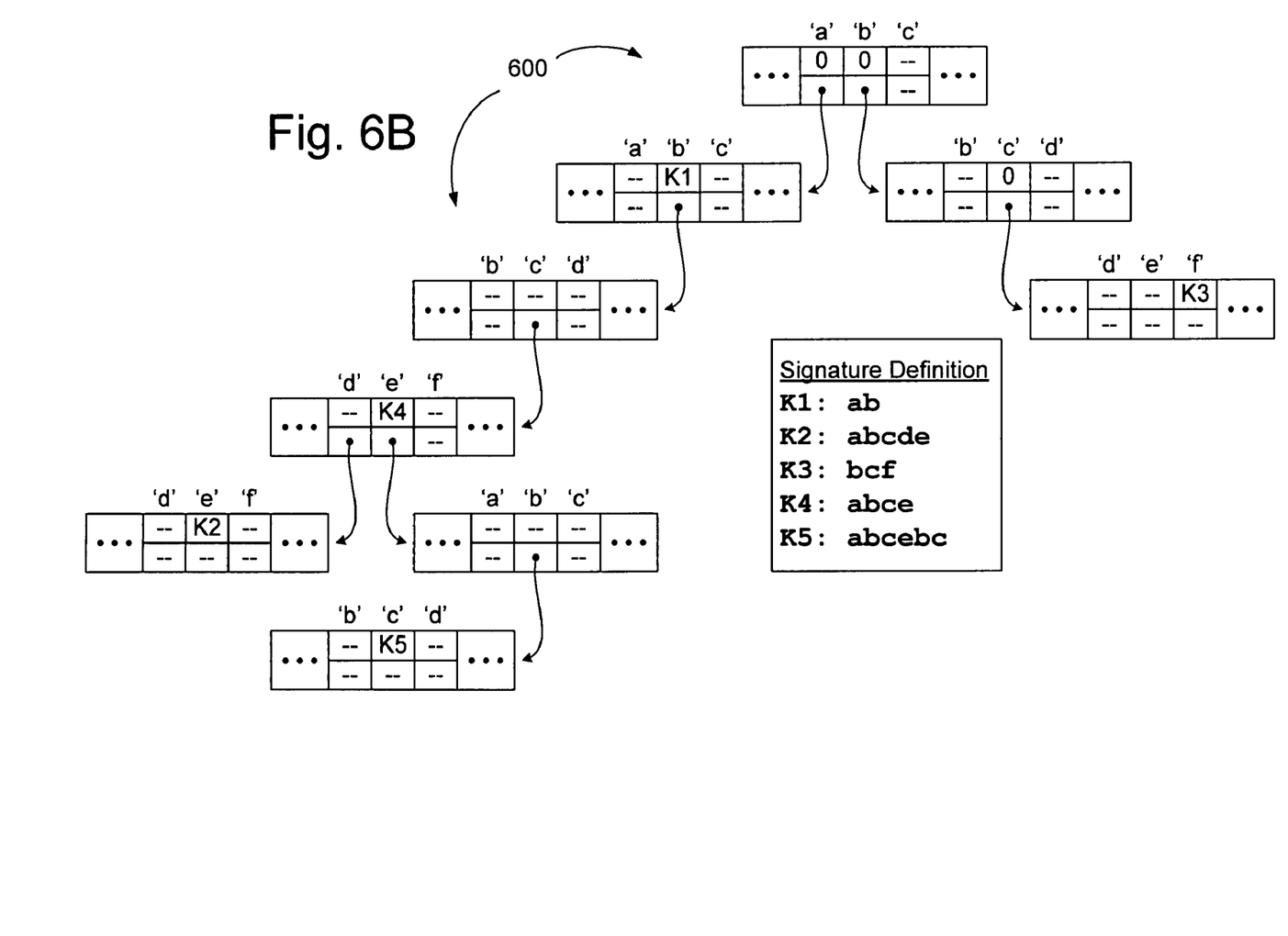
FIG. 6B illustrates the exemplary trie structure yielded by operation of the sequence in FIG. 6A.

Applying the operations shown in FIG. 6A in context of the exemplary signature definition (i.e., signature list) shown in FIG. 6B yields the trie structure 600 shown in FIG. 6B.

In embodiments of the invention, the above-described techniques may be carried out, at least in part, by computer system having a processing entity and a system memory. The processing entity may include one or more processors (e.g., general-purpose processors and/or special-purposes processors such as a network processor), and the system memory may include any number of component memories including, without limitation, volatile and/or non-volatile memories. The processing entity (e.g., one or more processors) executes one or more sequences of one or more instructions stored in the system memory to perform the operations described above. In alternative embodiments, hard-wired circuitry may be used in place of or in combination with the programmed processing entity to implement the invention. Thus, embodiments of the invention are not limited to any specific combination of hardware circuitry and software.

The instructions executed by the processing entity to perform the operations described above may be transferred to the system memory from a computer-readable medium. A computer-readable medium may take many forms, including but not limited to, non-volatile media, volatile media, and transmission media. Non-volatile media may include, for example, optical or magnetic media (e.g., disks) and/or non-volatile semiconductor memory (e.g., flash memory or battery-backed memory). Transmission media may include, for example and without limitation, coaxial cables, copper wire and fiber optics. Transmission media may also take the form of electromagnetic or acoustic waves, such as those generated during radio-frequency, infra-red or other wireless communications.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Although the invention has been described with reference to specific embodiments thereof, it will be evident that various modifications and changes may be made thereto without departing from the broader spirit and scope of the invention. The specification and drawings are, accordingly, to be regarded in an illustrative rather than restrictive sense.

APPENDIX A

APPENDIX A

FormPcfTrie uses a 'd' bits at a time trie and forms a MOPS graph that uses branch nodes and path compressed nodes.
The original trie has the following values 'preprocessed' into the node collections after construction:
-node points to a TrieNode, which has pointer space to point to all the 2^d combinations of characters
-The number of non-null in this is stored (non-null = # indices that have either a next pointer or an output)
-For each 'node', a corresponding collection of 'pcfnodes' is formed. 'pcfnode' is used to refer to any node in the MOPS graph..note that a pcfnode can be a branch node or a PC node.
-If the node has more than 1 non-null, then a branch node collection with that many branch nodes is allocated.
The non-null indices in node are made to point to the corresponding pcfnode for ease of debugging.
-If multiple nodes are in a 1-way branch, a single pcfnode corresponding to the start of the 1-way branch is made
-Size of a pc node that stores a branch is limited, and so even if a longer 1-way branch exists, it is broken into multiple pcfnodes. This allows in aligning to the memory width.

APPENDIX A-continued

-This function is recursive
*/
```
void FormPcfTrie(TrieNode node)
{
    PcfNode pcfnodes, parent_pcf;
    TrieNode parent, ancestor,curr;
    int i,j,k, non_null_index,indexInAncestor;
    char *bmp;
    TrieNode next_node;
    if (node == NULL) return;
    if (node->num_non_null == 0) return;
    parent = node->parent;
    if (node->num_non_null > 1)
    {
        /*Branch Node collection*/
        pcfnodes = calloc (node->num_non_null, sizeof (struct
        PCFTRIENODE));
        if (parent != NULL)
        {
            /*Not at root*/
            for (curr=node,ancestor = parent, indexInAncestor=
            node->indexInParent;
                (ancestor->is_mid_pc == 1); )
            {
                assert (ancestor->is_start_pc !=1);
                curr    = ancestor;
                ancestor = ancestor->parent;
                indexInAncestor = curr->indexInParent;
            }
            parent_pcf = ancestor->pcfnodes[indexInAncestor];
            parent_pcf->snode_type = NODE_BRN;
            parent_pcf->sptr = pcfnodes;
            bmp = parent_pcf->bmp;
        }
        else
        {
            /*at root*/
            assert (node ==glob.trie->trieHead);
            glob.pcftrie->root.sptr = pcfnodes;
            glob.pcftrie->root.snode_type = NODE_BRN
            bmp = glob.pcftrie->root.bmp;
        }
        for (i=0,j=0; (i< TABENTS); i++)
        {
            bmp[i] = 0;
            node->pcfnodes[i] = NULL;
            if ((node->next[i] != NULL) || (node->output[i] != 0))
            {
                node->pcfnodes[i] = pcfnodes+j;
                if (parent != NULL)
                {
                    /*copy string from parent..used while doing
                    construction, not needed during search, and hence
                    not stored in search memory*/
                    for (k=0; (k<parent_pcf->len_incl_node); k++)
                    {
                        pcfnodes[j].str_incl_node[k] =
                        parent_pcf->str_incl_node[k];
                    }
                    pcfnodes[j].len_incl_node = parent_pcf->len_
                    incl_node;
                }
                else
                {
                    pcfnodes[j].len_incl_node = 0;
                }
                pcfnodes[j].len_incl_node++;
                pcfnodes[j].str_incl_node[pcfnodes[j].len_incl_
                node-1] = i;
                bmp[i] = 1;
                pcfnodes[j].output = node->output[i];
                j++;/*go to the next non-null*/
                FormPcfTrie(node->next[i]);
            }
        }
    }
    else /*pcnode*/
    {
        pcfnodes = calloc (1, sizeof(struct PCFTRIENODE));
```

APPENDIX A-continued

```
        if (parent != NULL)
        {
            /*not at root*/
            /*if parent is path compressed, then have to find the start
            of the path compression, and then find the PCF Node
            correspoding to the start*/
            for (curr=node,ancestor = parent, indexInAncestor=
            node->indexInParent;
                    (ancestor->is_mid_pc == 1); )
            {
                assert (ancestor->is_start_pc != 1);
                curr    = ancestor;
                ancestor = ancestor->parent;
                indexInAncestor = curr->indexInParent;
            }
            parent_pcf = ancestor->pcfnodes[indexInAncestor];
            parent_pcf->snode_type = NODE_PCN;
            parent_pcf->sptr = pcfnodes;
        }
        else /*at root*/
        {
            assert (node == glob.trie->trieHead);
            glob.pcftrie->root.sptr = pcfnodes;
            glob.pcftrie->root.snode_type = NODE_PCN;
        }
        assert (node->is_start_pc ==1);
        node->pcfnodes[node->non_null_index] = pcfnodes;
        if (parent != NULL)
        {
            /*copy string from parent*/
            for (k=0; (k<parent_pcf->len_incl_node); k++)
            {
                pcfnodes[0].str_incl_node[k] = parent_pcf->str_
                incl_node[k];
            }
            pcfnodes[0].len_incl_node = parent_pcf->len_incl_node;
        }
        else
        {
            pcfnodes[0].len_incl_node = 0;
        }
        pcfnodes[0].len= node->pclen;
        pcfnodes[0].str[0] = node->non_null_index;
        pcfnodes[0].len_incl_node++;
        pcfnodes[0].str_incl_node[pcfnodes[0].len_incl_node-1] =
        node->non_null_index
        next_node = node->next[node->non_null_index];
        for (i=1; (i<node->pclen); i++)
        {
            /*form the pc string*/
            non_null_index = next_node->non_null_index;
            pcfnodes[0].str[i] = non_null_index;
            pcfnodes[0].len_incl_node++;
            pcfnodes[0].str_incl_node[pcfnodes[0].len_incl_
            node-1] = non_null_index;
            assert (next_node->is_mid_pc == 1);
            if (next_node->output[non_null_index] != 0)
            {
                assert (i==node->pclen-1);
                pcfnodes[0].output = next_node->output[non_null_
                index];
            }
            next_node = next_node->next[non_null_index];
        }
        FormPcfTrie(next_node);
    }
};
/*This function is used in construction of the MOPS graph while
filling in fail pointers.
It is also used in searching a text string. It allows to specify
the start and end of the text string being searched.
'Parent' is passed in and is assumed to have 'fullymatched'.
Matching begins by matching str[start] with the first character
in parent->sptr, and following further success pointers.
If matching succeeds fully, then the pointer to the pcf node
that "contains" str[end] is returned. This could be a branch node,
or a path compressed node with a prefix or whole of the string stored in it
matching.
If toPrintOutputs is 1, then all outputs encountered when strings stored in
a node are fully matched are output.
If a mismatch is found, NULL is returned*/
PcfNode FindPcfNodeOfString (PcfNode parent, char *str, int start, int
end,
                                             int toPrintOutputs)
{
    char nextchar;
    int i, j, type;
    PcfNode pcfnode, fullymatched;
    char *bmp;
    fullymatched = parent;
    for (pcfnode = parent->sptr, type=parent->snode_type;
        ( (start <= end) && (pcfnode != NULL)); )
    {
        if (type == NODE_BRN)
        {
            bmp = parent->bmp;
            nextchar =str[start];
            if (bmp[nextchar] == 1)
            {
                for (i=0,j=0; (i < nextchar); i++)j+=bmp[i];
                fullymatched = &pcfnode[j];
                type  = pcfnode[j].snode_type;
                pcfnode = pcfnode[j].sptr;
                if ((pcfnode->output != 0) && toPrintOutputs)
                printf("Output: K%d\n");
                start ++;
            }
            else
            {
                fullymatched = NULL;
                break;
            }
        }
        else if (type == NODE_PCN)
        {
            for (j=0; (j<pcfnode->len); j++)
            {
                if (start + j > end)
                {
                    /*ran out of characters to match in search string*/
                    break;
                };
                if (str[start+j] != pcfnode->str[j])
                {
                    /*mismatch*/
                    fullymatched = NULL;
                    break;
                }
            }
            if (fullymatched == NULL)
            {
                /*mismatch found*/
                pcfnode = NULL;
            }
            else if (start + j > end)
            {
                /* no mismatch, prefix of stored string is
                matched by suffix of search string. That is, search
                string 'ends' in this node*/
                if ((pcfnode->output != 0) && (toPrintOutputs))
                    printf("Output K%d\n",pcfnode->output);
                fullymatched = pcfnode;
                start += j;
                pcfnode = NULL;
            }
            else
            {
                /*have to continue further*/
                start += pcfnode->len;
                fullymatched = pcfnode;
                type  = pcfnode->snode_type;
                pcfnode = pcfnode->sptr;
            }
        }
    }/*end for*/
    return (fullymatched);
};
void PrintPcfNode (PcfNode pcfnode)
```

APPENDIX A-continued

```
{
    int i;
    printf("\n---------------------------\n");
    printf("\n\nNode pointer = %p\n",pcfnode);
    printf("Length stored = %d\n",pcfnode->len);
    printf("String stored: \n");
        for (i=0; (i<pcfnode->len); i++)
        {
            if (pcfnode->str[i] > 9) printf("%c",'a'+pcfnode->
                str[i]-10);
            else printf("%c",'0'+pcfnode->str[i]);
        }
    printf("\nFail Ptr = %p\n",pcfnode->fptr);
    printf("Backoff = %d\n", pcfnode->backoff);
    printf("Success node type = %d\n",pcfnode->snode_type);
    printf("Success node = %p\n",pcfnode->sptr);
    printf("Len of string from root including in node =
        %d\n",pcfnode->len_incl_node);
    printf("String from root, including this node:\n");
    for (i=0; (i<pcfnode->len_incl_node); i++)
        {
            if (pcfnode->str_incl_node[i] > 9) printf("%c",'a'+
                pcfnode->str_incl_node[i]-10);
            else printf("%c",'0'+pcfnode->str_incl_node[i]);
        }
}
void FillFailPtr(PcfNode pcfnode)
{
    int start, len_upto;
    for (pcfnode->fptr = NULL, start=1;
        ((pcfnode->fptr == NULL) && (start < pcfnode->
            len_incl_node) ); start++)
    {
        pcfnode->fptr = FindPcfNodeOfString (&glob.pcftrie->root,
                            pcfnode->str_incl_node,start,
                            pcfnode->len_incl_node-1,0);
    }
    if (pcfnode->fptr != NULL)
    {
        if (pcfnode->fptr->len == 0)
        {
            /*pointing to BR Node*/
            len_upto = pcfnode->fptr->len_incl_node - 1;
        }
        else
        {
            /*pointing to PC Node*/
            len_upto = pcfnode->fptr->len_incl_node -
                pcfnode->fptr->len;
        }
        /*start-1 is the length of the prefix string taken away from
        string at pcfnode in order to reach node pointed to by
        failure pointer. Hence, lenofstringatpcfnode-(start-1) is len
        of string reached into node pointed by failure pointer. To
        align to start of that node, subtract the length of the string
        up to that node*/
        pcfnode->backoff = pcfnode->len_incl_node -
            (start-1) - len_upto;
    }
    PrintPcfNode (pcfnode);
}
void CreateFailPtrs(PcfNode parent)
{
    int i,j;
    PcfNode basepcf,pcfnode;
    if (parent == NULL) return;
    FillFailPtr (parent);
    if (parent->snode_type == NODE_BRN)
    {
        basepcf = parent->sptr;
        for (i=0,j=0; (i<TABENTS); i++)
        {
            if(parent->bmp[i] != 0)
            {
                pcfnode = basepcf+j;
                j++;
                CreateFailPtrs(pcfnode);
            }
        }
    }
    else /*parent>snode_type == PCNODE*/
    {
        CreateFailPtrs(parent->sptr);
    }
}
void SearchTextInPcf (PcfNode root, char *str, int start, int end,
                                    int toPrintOutputs)
{
    char nextchar;
    int i, j, type, parent_backoff=0;
    PcfNode pcfnode;
    char *bmp;
    PcfNode parent_fptr=NULL;
    for (pcfnode = root->sptr, type=root->snode_type,
        bmp=root->bmp;
            ( (start <= end) && (pcfnode != NULL) ); )
        {
            if (type == NODE_BRN)
            {
                nextchar=str[start];
                if (bmp[nextchar] == 1)
                {
                    for (i=0,j=0; (i < nextchar); i++) j+=bmp[i];
                    pcfnode = &pcfnode[j];
                    type   = pcfnode->snode_type;
                    bmp    = pcfnode->bmp;
                    parent_fptr = pcfnode->fptr;
                    parent_backoff = pcfnode->backoff;
                    //pcfnode = pcfnode->sptr;
                    if ((pcfnode->output != 0) && toPrintOutputs)
                        printf("Output: K%d\n");
                    start ++
                }
                else /*failed on bitmap*/
                {
                    /*Follow failover pointer stored in node*/
                if (pcfnode->fptr)
                {
                    parent_fptr = NULL;
                    parent_backoff = 0;
                    start -= pcfnode->backoff;
                    if (pcfnode->fptr->len == 0) type=NODE_BRN;
                    else type=NODE_PCN;
                    pcfnode = pcfnode->fptr;
                    bmp = pcfnode->bmp;
                    continue;
                }
                else /*go back to root*/
                {
                    parent_fptr = NULL;
                    parent_backoff = 0;
                    pcfnode = root->sptr;
                    bmp = root->bmp;
                    type = pcfnode->snode_type;
                    start++;
                    continue;
                }
            }
        }
        else if (type == NODE_PCN)
        {
            for (j=0; (j<pcfnode->len); j++)
            {
                if (start + j > end)
                {
                    /*ran out of characters to match in search string*/
                    break;
                };
                if (str[start+j] != pcfnode->str[j])
                {
                    /*mismatch*/
                    break;
                }
            }
            if (start + j > end)
            {
                /*done*/
                break;
```

APPENDIX A-continued

```
        }
        else if (j==pcfnode->len)
        {
            /*all chars matched, have to continue further*/
            start += pcfnode->len;
            type   = pcfnode->snode_type;
            parent_fptr = pcfnode->fptr;
            parent_backoff = pcfnode->backoff;
            bmp = pcfnode->bmp;
            pcfnode = pcfnode->sptr;
        }
        else /*mismatch found in string*/
        {
            if (parent_fptr == NULL)
            {
                pcfnode = root->sptr;
                type = root->snode_type;
                bmp = root->bmp;
                start ++;
            }
            else
            {
                start -= (parent_backoff + j);
                pcfnode = parent_fptr;
                bmp = pcfnode->bmp;
                if (pcfnode->len == 0) type=NODE_BRN;
                else type=NODE_PCN;
            }
        }
    }
} /*end for*/
};
```

What is claimed is:

1. A method performed by a processor for constructing a finite state machine (FSM) of searchable strings, the method comprising:

receiving a set of searchable strings, each of which comprises a number of characters;

forming a hierarchical trie structure using the set of searchable strings, wherein the forming comprises storing the characters of the set of searchable strings within a plurality of child nodes descending from a root node of the trie structure; and constructing a FSM using the hierarchical trie structure, wherein the constructing comprises forming a plurality of state entries of the FSM, each comprising a substring whose length is bound by a maximum size limitation placed on a memory device for storing the FSM, wherein the constructing comprises:

traversing the hierarchical trie structure node by node;

maintaining a substring in the FSM by retaining the character stored at a current node if (a) the current node has more than one child node immediately descending therefrom, (b) the current node has less than one child node immediately descending therefrom, or (c) the current node comprises a last character of a searchable string; and forming a new substring in the FSM by concatenating the character stored at the current node and a parent node immediately preceding the current node to form a compressed node embodying the characters of the current node and the parent node if a length of the new substring is less than or equal to the maximum size limitation placed on the memory device, wherein a said each state entry of the FSM corresponding to the compressed node includes only one failure transition.

2. The method as recited in claim 1 wherein the:

maintaining a substring in the FSM further comprises retaining the character stored at the current node if the length of the new substring is greater than the maximum size limitation placed on the memory device.

3. The method as recited in claim 2, wherein said constructing further comprises adding failure pointers and back-off values to each substring in the FSM.

4. A method performed by a processor for forming a finite state machine (FSM) of searchable strings that each comprises a number of characters, the method comprising:

forming a hierarchical trie structure embodying the searchable strings, wherein the characters of the searchable strings are stored within a plurality of branches of sequential nodes extending from a root node of the trie structure;

traversing the hierarchical trie structure to sequentially select the nodes therein;

for each selected node, selectively concatenating the character stored at the selected node and the character stored at a child node immediately descending from the selected node to form a compressed node embodying the characters at the selected node and the child node if (a) the selected node is not a branch node that has more than one child node immediately descending therefrom and (b) the selected node is not an output node that comprises a last character of one of the searchable strings; and constructing the FSM, by the processor, using the hierarchical trie structure including the compressed nodes, wherein the FSM includes a plurality of state entries each corresponding to an associated node of the trie, and wherein the state entry for each compressed node includes only one failure transition.

5. The method of claim 4, wherein the character stored at the selected node and the character stored at the child node immediately descending from the selected node are concatenated to form the compressed node only if the selected node does not immediately descend from a branch node.

6. The method of claim 4, wherein the character stored at the selected node and the character stored at the child node immediately descending from the selected node are concatenated to form the compressed node only if a length of a substring embodied by the compressed node is less than or equal to a data width of a memory device configured to store the FSM.

7. A system including a search engine for searching an input string for a plurality of searchable strings that each comprises a number of characters, the search engine comprising:

means for forming a hierarchical trie structure embodying the searchable strings, wherein the characters of the searchable strings are stored within a plurality of branches of sequential nodes extending from a root node of the trie structure;

means for traversing the trie structure to sequentially select the nodes therein;

means for selectively concatenating the character stored at each selected node and the character stored at a child node immediately descending from the selected node to form a compressed node embodying both characters if (a) the selected node is not a branch node that has more than one child node immediately descending therefrom and (b) the selected node is not an output node that comprises a last character of one of the searchable strings; and means for constructing a Finite State Machine (FSM) using the hierarchical trie structure including the compressed nodes, wherein the FSM includes a plurality of state entries each corresponding to an associated node of the trie, and wherein the state entry for each compressed node includes only one failure transition.

8. The system of claim 7, wherein the character stored at the selected node and the character stored at the child node immediately descending from the selected node are concatenated to form the compressed node only if the selected node does not immediately descend from a branch node.

9. The system of claim 7, wherein the character stored at the selected node and the character stored at the child node immediately descending from the selected node are concatenated to form the compressed node only if a length of a substring embodied by the compressed node is less than or equal to a data width of a memory device configured to store the FSM embodying the trie structure.

\* \* \* \* \*